United States Patent
Eida et al.

(10) Patent No.: US 6,221,517 B1
(45) Date of Patent: Apr. 24, 2001

(54) FLUORESCENCE-REDDENING MEMBRANE AND RED-EMITTING DEVICE

(75) Inventors: Mitsuru Eida; Hidetsugu Ikeda; Jun Tsuchiya, all of Chiba-ken (JP)

(73) Assignee: Idemitsu Kosan Co., Ltd., Tokyo (JP)

(*) Notice: Subject to any disclaimer, the term of this patent is extended or adjusted under 35 U.S.C. 154(b) by 0 days.

(21) Appl. No.: 09/117,547

(22) PCT Filed: Oct. 14, 1996

(86) PCT No.: PCT/JP96/02966

§ 371 Date: Aug. 7, 1998

§ 102(e) Date: Aug. 7, 1998

(87) PCT Pub. No.: WO97/29163

PCT Pub. Date: Aug. 14, 1997

(30) Foreign Application Priority Data

Feb. 9, 1996 (JP) .................................................... 8-23609

(51) Int. Cl.$^7$ ...................................................... G01J 1/58
(52) U.S. Cl. ........................... 428/690; 428/917; 313/501; 313/504; 257/98; 250/483.1; 252/301.16; 252/301.35
(58) Field of Search ................................. 428/195, 41.6, 428/690, 917; 250/483.1, 227.8; 313/501, 504; 257/98; 252/301.16, 301.35

(56) References Cited

U.S. PATENT DOCUMENTS 4,262,206 * 4/1981 Viehmann ............................ 250/483

5,126,214   6/1992 Tokailin et al. .

FOREIGN PATENT DOCUMENTS 0 387 715   9/1990 (EP) .

OTHER PUBLICATIONS

W. Viehmann, et al., Nuclear Instruments and Methods, vol. 167, No. 3, pp. 405–415, "Thin Film Waveshifter Coatings for Fluorescent Radiation Converters", 1979.

G. E. Johnson, et al., Pure & Appl. Chem., vol. 67, No. 1, pp. 175–182, "Electroluminescence from Single Layer Molecularly Doped Polymer Films", 1995.

Y. Saito, et al., Applied Physics Letters, vol. 56, No. 9, pp. 811–813, "Simultaneous Three Primary Color Laser Emissions from Dye Mixtures", Feb. 26, 1990.

* cited by examiner

Primary Examiner—William Krynski
Assistant Examiner—D. Garrett
(74) Attorney, Agent, or Firm—Oblon, Spivak, McClelland, Maier & Neustadt, P.C.

(57) ABSTRACT

The present invention provides a fluorescence-reddening membrane which is made up of a light-transmittable medium and, dispersed therein, (a) a rhodamine base fluorescence pigment and (b) a fluorescence pigment which has absorptions in the blue region and induces energy transfer to and reabsorptions from the rhodamine base fluorescence lamp at high conversion effieciencies.

19 Claims, 8 Drawing Sheets

FLUORESCENCE-REDDENING MEMBRANE AND RED-EMITTING DEVICE

TECHNICAL FIELD

The present invention relates to a fluorescence-reddening membrane and a red-emitting device using the same. More particularly, the present invention is concerned with a fluorescence-reddening membrane capable of converting the color of the light emitted by a blue-emitting organic electroluminescence (hereinafter abbreviated to "EL") device to a red light at a high conversion efficiency as high as at least 33%, and with an inexpensive red-emitting device which comprises the aforesaid fluorescence-reddening membrane and a light-emitting device, emits a red light at a high conversion efficiency, and also enables reduction in size and thickness.

BACKGROUND ART

An EL device which utilizes the electroluminescence is characterized by a high visual-distinguishability because of its self-emission, excellent impact resistance because of its being in the form of a complete solid device, and the like properties. Therefore, the EL device has been attracting attention for utilization as a light-emitting device in a variety of types of display apparatuses.

The EL device is divided into an inorganic EL device in which an inorganic compound is used as the light-emitting material, and an organic EL device in which an organic compound is used as the light-emitting material. Of these, the organic EL device, which can decrease the applied voltage to a great extent, has been positively studied for practical application as a display device of the next generation.

It is evident that multi-coloring is required for a display device in order to expand the use and application field of the above-mentioned organic EL device, as can be seen from the examples of the cathode-ray tube (CRT) and the liquid crystal display (LCD).

Several methods have heretofore been known as a method for preparing a multi-colored display apparatus by the use of an EL device, including, for example, (1) a method in which EL materials which emit light with three primary colors of red (R), green (G) and blue (B), respectively are each arranged in the form of matrix [refer to Japanese Patent Application Laid-Open Nos. 157487/1982 (Sho-57), 147989/1983 (Sho-58), 214593/1991 (Hei-3), etc.; (2) a method in which an EL material which emits light with white color is combined with a color filter to take out the three primary colors of R,G,B [refer to Japanese Patent Application Laid-Open Nos. 315988/1989 (Hei-1), 273496/1990 (Hei-2), 194895/1991 (Hei-3), etc.; (3) a method in which an EL material which emits light with blue color is combined with a fluorescence conversion membrane to take out the three primary colors of R,G,B [refer to Japanese Patent Application Laid-Open No. 152897/1991 (Hei-3), etc. and the like methods. However, the above-mentioned method (1) suffers the disadvantages that the three kinds of light-emitting materials must be arranged in the form of matrix in high precision and fineness, thereby causing technological difficulty and failure in its production at a low cost, and further that the three kinds of light-emitting materials usually have each a service life frequently different from one another, whereby the chromaticity of the emitted light deviates from the normal value with the lapse of time. On the other hand, the method (2) suffers the drawback that the utilization efficiency of the EL light is lowered, that is, the conversion efficiency is lowered, since part of the output light from the EL device which emits light with white color is taken out with a color filter to utilize the light. For example, when red color is taken out by the use of a color filter from a white El color consisting simply of the three primary colors each having a same intensity, the maximum obtainable conversion efficiency is only 33%. In practical application, however, the conversion efficiency is much lower than 33% taking into consideration the emission spectrum and visibility. The method (3) is made superior to the aforesaid method (2), if the three primary colors of R,G,B are each obtained at a conversion efficiency of at least 33% in the method (3).

There is well known a method in which fluorescence conversion membranes are arranged on an EL device to versatilely vary the color tone of the EL-emitting light color [refer to Japanese Patent Application Laid-Open Nos. 18319/1988 (Sho-63) and 152897/1991 (Hei-3)]. The blue color among R,G,B is emitted from the organic EL device itself, and thus may be utilized as such. In this case if the conversion efficiency is forced to be stated, it is 100%. With regard to green, a conversion efficiency of 80% is obtained by the use of coumarin 153 as is disclosed in Japanese Patent Application Laid-Open No. 152897/1991 (Hei-3)]. Nevertheless there is not yet known so far a method for converting the blue light of an EL device to red light at a conversion efficiency of at least 33%. For example, as is disclosed in Japanese Patent Publication Nos. 32879/1993 (Hei-5) and 33514/1993 (Hei-5), the light-emitting layer of the blue/green light-emitting inorganic EL device in which layer is dispersed rhodamine, that is, a red fluorescent coloring material, emits white light, thus failing to emit objective red light. likewise, white light instead of the objective red light is emitted form the blue/green light-emitting inorganic EL device the outside of which is fitted with the fluorescence conversion membrane composed of rhodamine B [Japanese Utility Model Application Laid-Open No.77299/1988 (Sho-63)], also from the blue/green light-emitting inorganic El device the outside of which is fitted with the fluorescence conversion membrane composed of the pink base fluorescent coloring material (produced by Sinloihi Co. Ltd. under the trade name "FA001") [Japanese patent Application Laid-Open No. 163159/1994 (Hei-6)]. In the case where the blue light-emitting organic EL device is fitted with the fluorescence conversion membrane composed of phenoxazone 9 and a color filter for regulating chromaticity [Japanese Patent Application Laid-Open No. 152897/1991 (Hei-3)], there is obtained a red light having a chromaticity, x of 0.62 and y of 0.33, but the converted light thus obtained is so faint as is visible only in a bright place with an extremely low conversion efficiency.

Japanese Patent Application Laid-Open No. 158091/1990 (Hei-2) describes the fluorescent substance having a main stimulating wavelength in the range of 440 to 560 nm and a main light-emitting wavelength in the range of 510 to 650 nm. However, the above-mentioned fluorescent substance is devoid of an absorption capable of interrupting at least blue color and consequently, can emit white color only.

Further, Japanese Patent Application Laid-Open No. 2205971/1985 (Sho-60) describes the wavelength-conversion fluorescent substance which absorbs the light having a peak wavelength in the range of 460 to 520 nm and emits light having a peak wavelength in the range of 590 to 610 nm. However, the aforesaid wavelength-conversion fluorescent substance fails to employ a fluorescent substance capable of selectively interrupting the blue color having a wavelength in the range of 460 to 520 nm and therefore, the fluorescent substance is incapable of selectively emitting red color.

As described hereinbefore, since the red fluorescence pigment which is typified by rhodamine base fluorescence pigment and phenoxazone base fluorescence pigment is usually devoid of an absorption in the blue color region, the independent use of the aforesaid red fluorescence pigment in a fluorescence-reddening membrane leads to failure to sufficiently interrupt the original blue light and as a result, to selectively obtain the objective red color by reason of the mixing of the blue light with the conversion light of red color. In the case where a color filter for chromaticity regulation is superimposed on the fluorescence-reddening membrane in order to interrupt the original blue light, the red conversion efficiency is inevitably lowered.

DISCLOSURE OF THE INVENTION

It is an object of the present invention to overcome the disadvantages inherent in the prior arts as described hereinbefore and at the same time, to provide a fluorescence-reddening membrane capable of converting the color of the light emitted by a blue-emitting organic electroluminescence (EL) device to a red light at a high conversion efficiency as high as at least 33%, and also to provide an inexpensive red-emitting device which utilizes the said fluorescence-reddening membrane and also enables reduction in size and thickness of itself.

Under such circumstances intensive research and ivestigation were accumulated by the present inventors in order to achieve the above-mentioned object. As a result, it has been found that a blue color of the light emitted by an organic electroluminescence (EL) device can be converted to a red light at a high conversion efficiency as high as at least 33% by a fluorescence conversion membrane which comprises a rhodamine base fluorescence pigment and, mixed therein a specific fluorescence pigment that has absorptions in the blue region so as to sufficiently interrupt blue lights and induces effective energy transfer to or reabsorption from said rhodamine base fluorescence pigment, said resultant mixture being dispersed in a light-transmittable medium; and that the device which comprises the fluorescence-reddening membrane and a light-emitting device is capable of emitting a red light at a high conversion efficiency and reducing the size and thickness of the device itself. The present invention has been accomplished by the foregoing findings and information.

That is to say, the present invention provides a fluorescence-reddening membrane which comprises a light-transmittable medium and dispersed therein, (a) a rhodamine base fluorescence pigment and (b) a fluorescence pigment that has absorptions in the blue region and induces energy transfer to or reabsorption from said rhodamine base fluorescence pigment. The present invention further provides an inexpensive red light-emitting device which comprises said fluorescence-reddening membrane and a light-emitting device.

It is preferable that the above-mentioned fluorescence-reddening membrane according to the present invention comprise a light-transmittable medium and, dispersed therein, a rhodamine base fluorescence pigment and a fluorescence pigment of naphthalimide base, coumarin base or the like. On the other hand, a fluorescence conversion membrane which comprises a light-transmittable medium and, dispersed therein, a rhodamine base fluorescence pigment alone, or a fluorescence pigment of naphthalimide base or coumarin base alone fails to attain a high conversion efficiency as high as at least 33%, or fails to emit a red light.

THE MOST PREFERRED EMBODIMENTS TO CARRY OUT THE INVENTION

Specifically, the fluorescence pigment which has absorptions in the blue region so that a blue light can be interrupted and at the same time, induces energy transfer to and reabsorption from the rhodamine base fluorescence pigment, preferably has absorptions in the blue region at a wavelength of 520 nm or less and an absorbance (optical density OD) of at least 1.0 at a wavelength of 420 to 490 nm. The aforesaid fluorescence pigment can sufficiently interrupt a blue light.

In addition, the rhodamine base fluorescence pigment as the component (a) has absorptions at 450 to 610 nm. Thus the absorption region of the rhodamine base fluorescence pigment as the component (a) partially overlaps the absorption region of the fluorescence pigment as the component (b), thus enabling effective energy transfer from the component (b) to the component (a). It is also possible that the rhodamine base fluorescence pigment as the component (a) reabsorbs the fluorescence from the fluorescence pigment as the component (b). In this case the rhodamine base fluorescence pigment as the component (a) emits red fluorescence of 600 nm or more.

As described hereinbefore, the fluorescence conversion membrane comprising the combination of both the fluorescence pigments dispersed in a light-transmittable medium, converts the blue light emitted by the organic EL device to a red light at a high conversion efficiency as high as 33%. Consequently, a red light emission can be assured.

Figure 1:
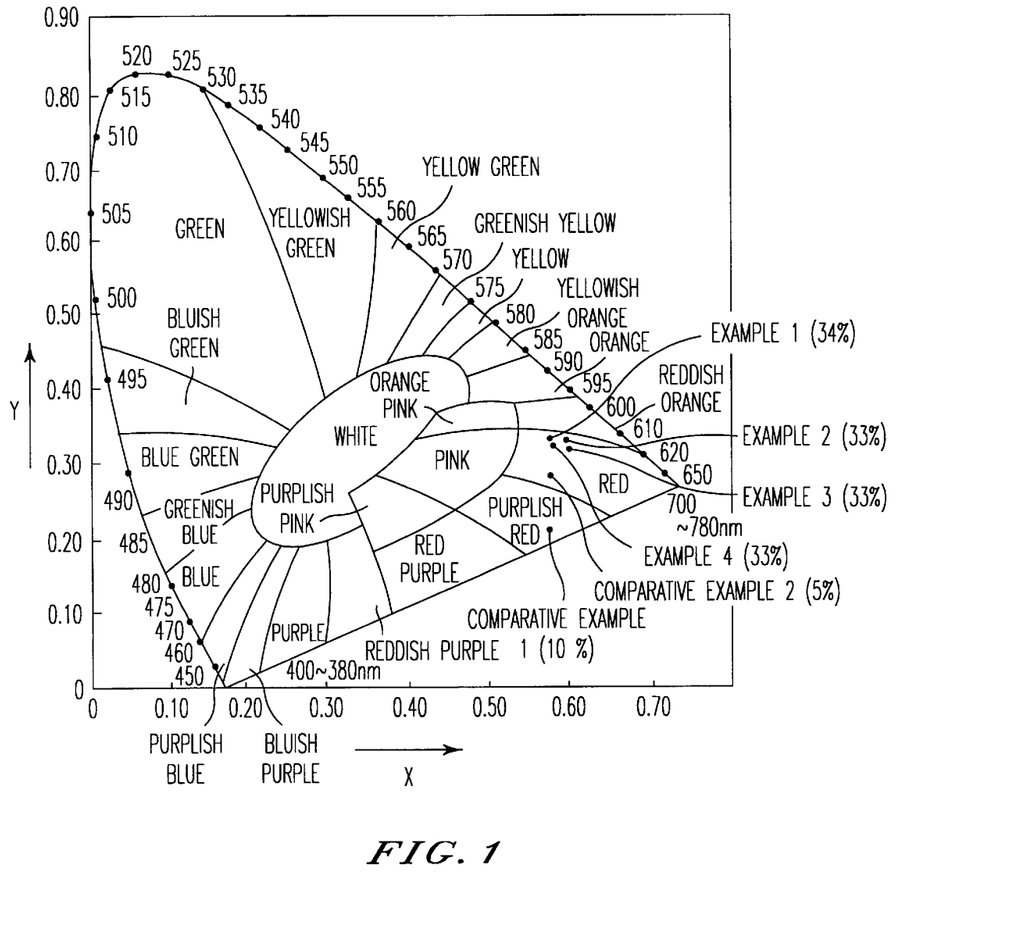
FIG. 1 is a chromaticity coordinate showing the region of each of the colors and the conversion efficiency thereof.

On the contrary, the fluorescence conversion membrane comprising the rhodamine base fluorescence pigment alone dispersed in a light-transmittable medium can not fully interrupt a blue light emitted by the organic EL device, thereby causing a blue light to mix in the converted red light, and leading to failure to selectively assure a red light. In the case where a color filter for chromaticity regulation is superimposed thereon in order to interrupt the blue color, a converted red color is obtained, but the conversion efficiency is as low as less than 33% (refer to Comparative Examples 1 & 2). On the other hand, the fluorescence conversion membrane comprising the naphthalimide base fluorescence pigment or the coumarin base fluorescence pigment alone disperse din a light-transmittable medium results in failure to emit a red light, since the membrane does not contain a red base fluorescence pigment, causing it to emit a green light. The chromaticity of the red color on the CIE coordiate as used in the present invention is given in FIG. 1.

By the term (a) a rhodamine base fluorescence pigment as mentioned herein is meant a fluorescence pigment which contains at least one kind of rhodamine coloring matter. Specific examples thereof include rhodamine 6 G, rhodamine B, rhodamine 3 B, rhodamine 101, rhodamine 110, basic violet 11 and sulforhodamine. The ratio of said coloring matter in each of the pigments is in the range of preferably 0.1 to 10%, more preferably 1.0 to 7.0% each by weight. The ratio of said coloring matter therein of less than 0.1% by weight unfavorably leads to insufficient color emission, whereas that of more than 10% by weight unfavorably brings about deterioration of fluorescence properties due to concentration quenching by the interaction of each of the coloring matters.

Examples of pigment components other than the coloring matters include polymethacrylic acid esters, polyvinyl chloride, poly(vinyl chloride/vinyl acetate) copolymer, alkyd resin, aromatic sulfonamide resins, urea resin, melamine resin and benzoguanamine resin. However, any of the foregoing coloring matters may be dispersed alone in a light-transmittable medium within the foregoing proportion.

Examples of the chemical constitutions of the rhodamine coloring matters are given in the following.

BASIC VIOLET 11

BASIC RED 1

RHODAMINE B

RHODAMINE 3B

RHODAMINE 101

RHODAMINE 6G

RHODAMINE 110

Any of the rhodamine coloring matters may be used alone or in combination with at least one other, and the mixture of basic violet 11 and rhodamine 6 G is preferable.

On the other hand, by the term a naphthalimide base fluorescence pigment as mentioned herein is meant a fluorescence pigment which contains at least one kind of naphthalimide coloring matter. Specific examples thereof include solvent yellow 44 and solvent yellow 116. The ratio of said coloring matter in each of the pigments is in the range of preferably 0.1 to 10%, more preferably 1.0 to 7.0% each by weight. The ratio of said coloring matter therein of less than 0.1% by weight unfavorably leads to insufficient color emission, whereas that of more than 10% by weight unfavorably brings about deterioration of fluorescence properties due to concentration quenching by the interaction of each of the coloring matters.

Examples of pigment components other than the coloring matters include polymethacrylic acid esters, polyvinyl chloride, poly(vinyl chloride/vinyl acetate) copolymer, alkyd resin, aromatic sulfonamide resins, urea resin, melamine resin and benzoguanamine resin. However, any of the foregoing coloring matters may be dispersed alone in a light-transmittable medium.

Examples of the chemical constitutions of the naphthalimide coloring matters are given in the following.

SOLVENT YELLOW 44

SOLVENT YELLOW 116

Any of the naphthalimide coloring matters may be used alone or in combination with at least one other, and the mixture of solvent yellow 116 and solvent yellow 44 is preferable.

In addition, by the term a coumarin base fluorescence pigment as mentioned herein is meant a fluorescence pigment which contains at least one kind of the coumarin coloring matter. Specific examples thereof include coumarin 153, coumarin 6, coumarin 7, coumarin 30 and basic yellow 51. The ratio of the coumarin coloring matter in each of the pigment is in the range of preferably 0.1 to 10%, more preferably 1.0 to 7.0% each by weight. The ratio of the coloring matter therein of less than 0.1% by weight unfavorably leads to insufficient color emission, whereas that of more than 10% by weight unfavorably brings about deterioration of fluorescence properties due to concentration quenching by the ieteraction of each of the coloring matters.

Examples of pigment components other than the coloring matters include polymethacrylic acid esters, polyvinyl chloride, poly(vinyl chloride/vinyl acetate) copolymer, alkyd resin, aromatic sulfonamide resins, urea resin, melamine resin and benzoguanamine resin. However, any of the foregoing coloring matters may be dispersed alone in a light-transmittable medium.

Examples of the chemical constitutions of the coumarin coloring matters are given in the following.

COUMARIN 30

COUMARIN 7

COUMARIN 6

COUMARIN 153

Any of the above-described coumarin coloring matters may be used alone or in combination with at least one other, among which are preferable coumarin 6 and coumarin 7 each having a high absorption coefficient.

The light-transmittable medium to be used for the fluorescence-reddening membrane according to the present invention needs only to have light-transmittability and membrane formability without specific limitation, and is exemplified for use by high molecular compounds, inorganic glass and a medium for printing. Examples of the high molecular compounds include polyvinylpyrrodinone, polymethyl methacrylate, polymethyl acrylate, polystyrene, polycarbonate, polyvinyl acetate, polyvinyl chloride, polybutene, polyethylene glycol, a copolymer thereof, and further, photosensitive resins such as photoresists, thermosetting resins such as epoxy resins. Moreover, a pigment component other than the above-exemplified coloring matters may be used as a light-transmittable medium.

Examples of the inorganic glass include borate glass and silica glass. Any of the above-exemplified light-transmittable media may be used alone or in combination with at least one other species. Of these is preferable a medium for printing, especially a light-transmittable medium for printing in which polyvinyl chloride resin or polyester resin is dissolved in a solvent.

The fluorescence-reddening membrane according to the present invention comprises, as principal components, the component(a), the fluorescence pigment as the component (b) and the light-transmittable medium. The fluorescence pigment as the component(b) is preferably contained in the aforesaid fluorescence-reddening membrane in an amount of 5 to 80% by weight. The amount thereof less than 5% by weight leads to insufficiency in coloring matter density required to assure the desired red light and to the necessity for extremely thickening the membrane (as thick as 100 μm or more), whereby uniform membrane thickness is made difficult to assure; whereas the amount thereof more than 80% by weight brings about poor membrane-formability as well as mechanically brittle membrane.

From the viewpoints of red color purity and membrane formability, the above-mentioned fluorescence pigment is dispersed in the light-transmittable medium preferably in an amount in the range of 10 to 60% by weight.

The ratio of the (a) rhodamine base fluorescence pigment to the (b) naphthalimide-base or coumarin-base fluorescence pigment, each being used in the invention depends upon the species of the fluorescence pigments, and it is preferably in the range of 20:1 to 1:20 by weight.

In the case where the ratio by weight of the (a) rhodamine base fluorescence pigment exceeds the aforestated range, the amount of the (b) naphthalimide-base or coumarin-base fluorescence pigment decreases, whereby the blue light emitted by the organic EL device is made impossible to be sufficiently interrupted and accordingly the desired red light is made unobtainable. Specifically, when the optical density (OD) at a wavelength in the range of 420 to 490 nm, that is, the blue light region, is made to less than 1.0, the blue light leaks remarkably, thereby making the desired red light difficult to obtain.

On the other hand, in the case where the ratio by weight of the (a) rhodamine base fluorescence pigment is made lower than the aforestated range, the energy transfer from the (b) fluorescence pigment to the (a) rhodamine base fluorescence pigment, or reabsorption form the pigment(a) decreases, thereby making the desired red light difficult to obtain in high efficiency.

Therefore, from the aspect of the red light purity and the conversion efficiency, the ratio by weight of the (a) rhodamine base fluorescence pigment to the (b) fluorescence pigment which has absorptions in the blue region and thus interrupts blue light is more preferably in the range of 10:1 to 1:10.

The process for producing the fluorescence-reddening membrane according to the present invention is not specifically limited, but can be selected for use from a variety of processes. For example, the objective fluorescence-reddening membrane is obtained by a process in which the (a) rhodamine base fluorescence pigment and the (b) naphthalimide-base or coumarin-base fluorescence pigment are mixed with and dispersed in the light-transmittable medium, and the mixture this produced is formed into a membrane by any of the methods including casting, spin coating, printing, bar coating, extrusion molding, roll molding, pressing, spraying and roll coating. An organic solvent, when used for the membrane forming, is exemplified by dichloromethane; 1,2-dichloroethane; chloroform; acetone; cyclohexanone; toluene; benzene; xylene; N,N-dimethylformamide; dimethylsulfoxide; 1,2-dimethoxyethane; diethylene glycol dimethyl ether; N-methylpyrrolidone; ethylene glycol monomethyl ether (methyl Cellosolve); ethylene glycol monoethyl ether (ethyl Cellosolve); ethylene glycol monoethyl ether acetate (ethyl Cellosolve acetate). Any of these solvents may be used alone or in combination with at least one other. In the case of casting, for example, a fluorescence-reddening membrane in the form of thin film can be produced by dissolving the fluorescence pigments and the light-transmittable medium in a suitable solvent selected from among the aforestated solvents, and gradually adding dropwise the solution thus obtained onto a substrate such as a glass substrate to evaporate the solvent.

Aside from the foregoing, the red-emitting device according to the present invention comprises the above-described fluorescence-reddening membrane and a light emitting device. A blue light-emitting organic EL device is preferably usable for said light emitting device, and can be prepared by any of the methods disclosed in Japanese Patent Application Laid-Open Nos. 47890/1991 (Hei-3), 231970/1991 (Hei-3), 17765/1993 (Hei-5), 135878/1993 (Hei-5), 140145/1993 (Hei-5), 247458/1993 (Hei-5), 247459/1993 (Hei-5), 100857/1994 (Hei-6), 132080/1994 (Hei-6), etc. For example, the blue light-emitting organic EL device can be fabricaed by a method wherein a transparent supporting substrate composed of a glass substrate on which a membrane of indium/tin oxide (hereinafter abbreviated to "ITO") is formed as an electrode is subjected to vacuum deposition successively by the use of 4,4'-bis[N-phenyl-N-(3-methylphenyl)amino]biphenyl(TPD); 4,4'-bis(2,2-diphenyl-vinyl)-biphenyl (DPVBi); tris(8-quinolinol) aluminum (Alq); and magnesium/silver electrode to form a multi-layer structure (refer to Preparation Example 1).

In the case where a light-emitting device and a fluorescence-reddening membrane are brought into tight contact with each other in the preparation of the red-emitting device according to the present invention, there is preferably used, between each of the membranes, a material having a high refractive index as compared with air such as the above-described light-transmittable medium in order to prevent light scattering and also enhance the conversion efficiency. For the sake of simplicity, it is possible to insert an inert liquid such as a fluorohydrocarbon therebetween (refer to Examples 1 & 2).

In the following, the present invention will be described in more detail with reference to working examples, which however shall not limit the present invention thereto.

PREPARATION EXAMPLE 1

(preparation of blue-emitting organic EL device)

A transparent supporting substrate was prepared by forming a membrane of an INTO electrode in a thickness of 100 nm on a glass substrate sized 25 mm×75 mm×1.1 mm, and was subjected to ultrasonic cleaning by the use of isopropyl alcohol for 5 minutes, to cleaning with pure water for 5 minutes, and further to ultrasonic cleaning by the use of isopropyl alcohol for 5 minutes. Thereafter, the resultant transparent supporting substrate was fixed to a substrate holder of a vacuum deposition apparatus. In a molybdenum-made boat for resistance heating was placed 200 mg of 4,4'-bis [N-phenyl-N-(3-methylphenyl)amino]biphenyl (TPD). Further, in another molybdenum-made boat for resistance heating was placed 200 mg of 4,4'-bis (2,2-diphenylvinyl)bi-phenyl (DPVBi); and also 200 mg of tris (8-quinolinol)-aluminum (Alq). Then, the inside of a vacuum chamber was depressurized to $1 \times 10^{-4}$ Pa. The boat containing the TPD was heated to 215 to 220° C. to deposit the TPD onto the substrate at a deposition rate of 0.1 to 0.3 nm/second to form a membrane in a film thickness of 60 nm as a hole injection layer, while the substrate maintained from temperature. In addition, without taking the resultant hole injection layer out of the vacuum chamber, the DPVBi was deposited onto the substrate at a boat temperature of 250° C. at a deposition rate of 0.1 to 0.2 nm/second to form a membrane in a film thickness of 40 nm as an light-emitting layer.

Subsequently, the Alq was further deposited onto the substrate at a boat temperature of 250° C. at a deposition rate of 0.1 to 0.3 nm/second to form a membrane in a film thickness of 20 nm as an electron-transporting layer. The substrate this treated was taken out of the vacuum chamber, equipped with a stainless-steel made mask on the side of the electron-transporting layer, and again fixed to the substrate holder. Then 0.5 g of silver wire was put in a tungsten-made basket; 1 g of magnesium ribbon was put in a boat made of molybdenum; the inside of the vacuum chamber was depressurized to $1 \times 10^{-4}$ Pa; and silver (deposition rate of 0.1 nm/sec) and magnesium (deposition rate of 0.8 nm/sec) were simultaneously doposited to form a cathode membrane, thereby preparing a blue-emitting organic EL device.

Figure 2:
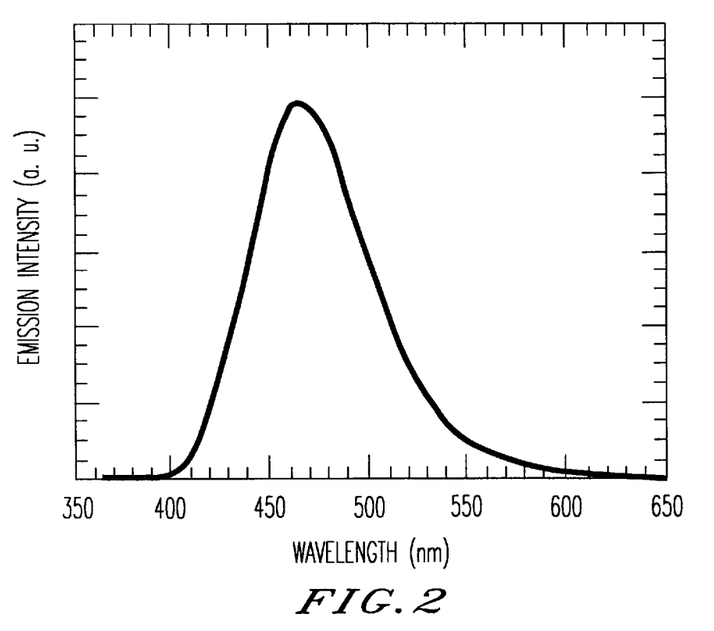
FIG. 2 is an emission spectrum of an organic EL device.

The emission spectrum of the resultant organic EL device is given in FIG. 2.

PREPARATION EXAMPLE 2

(Preparation of color filter for chromaticity regulation)

Figure 3:
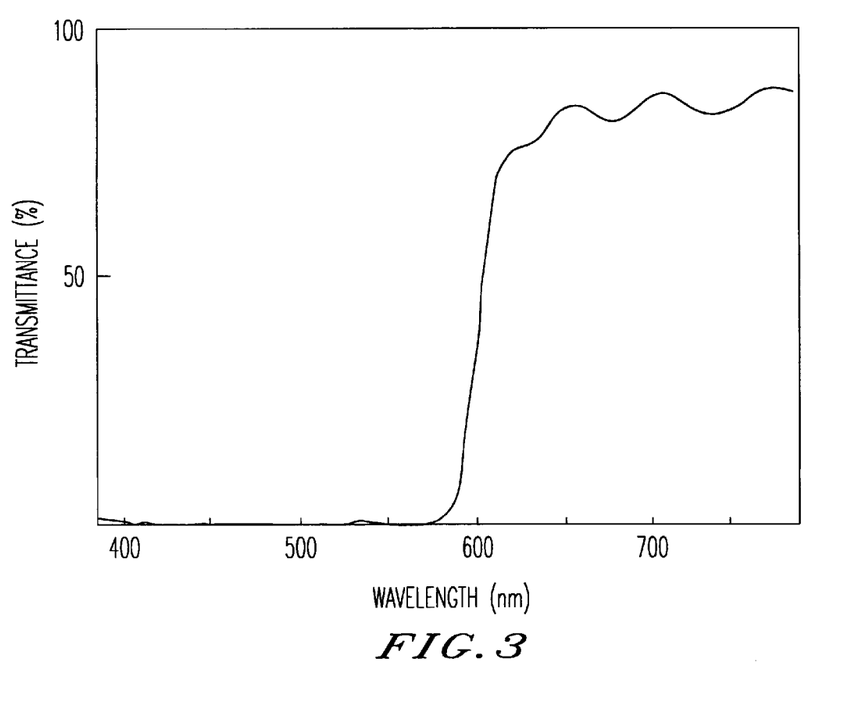
FIG. 3 is a transmission spectrum of a color filter for chromaticity regulation.

A color filter for chromaticity regulation was prepared by subjecting a red color resist (produced by Fuji Hunt Electronics Technology Co., Ltd. under the trade name CR-2000) to spin coating on a glass substrate, drying it at 80° C. in an oven and curing at 200° C. in the oven. The resultant membrane had a thickness of 2.3 $\mu$m as measured with a surface roughness meter. The transmission spectrum of the membrane is given in FIG. 3.

EXAMPLE 1

A bar coated membrane to be used as a fluorescence-reddening membrane was prepared by dissolving 0.12 g of a naphthalimide base fluorescence pigment containing benzoguanamine resin, 2% by weight based on the same of solvent yellow 116 and 6% by weight based on the same of solvent yellow 44; and 0.2 g of a rhodamine base fluorescence pigment containing benzoguanamine resin, 2% by weight based on the same of basic violet 11 and 2% by weight based on the same of rhodamine 6G, in 2 g of an ink (solid content of 40% by weight) in which polyvinyl chloride resin (molecular weight of 20,000) as a printing medium was dissolved in cyclohexanone. The resultant membrane had a thickness of 36 $\mu$m as measured with a micrometer.

Figure 4:
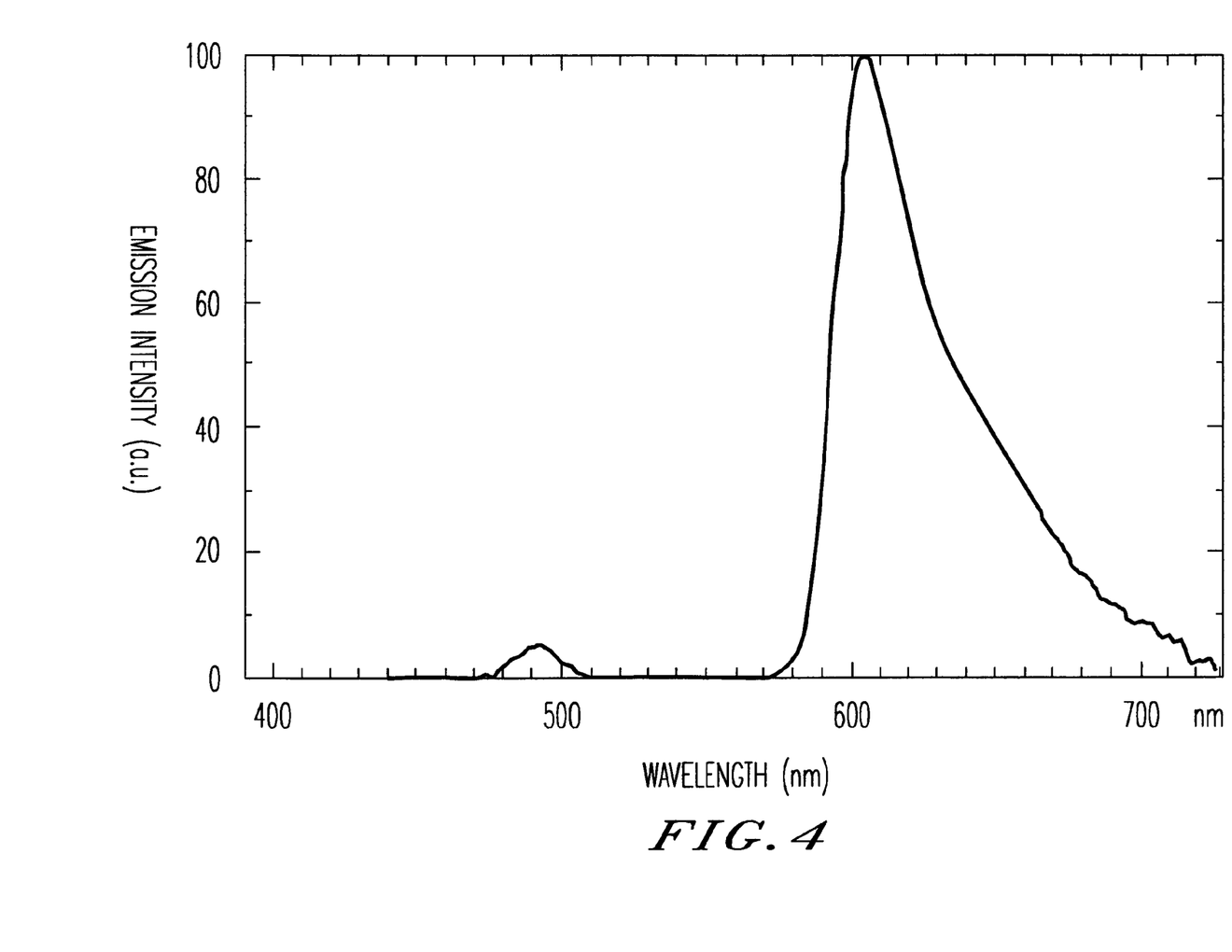
FIG. 4 is a red emission spectrum in Example 1.

Subsequently, the blue-emitting organic EL device (chromaticity x of 0.16 and y of 0.15, blue) which had been obtained in Preparation Example 1 was allowed to emit light under the conditions including a voltage of 7V and a current density of 4.2 mA/cm$^2$, and was brought into tight contact with the fluorescence-reddening membrane thus prepared, while a fluorohydrocarbon liquid (produced by 3 M Co., Ltd. under the trade name FC-70) was inserted therebetween so as to form a red-emitting deveice. A measurement was made of the brightness of the output light by means of a brightness meter (produced by Minolta Co., Ltd. under the trade name CS-100). As a result, the blue light prior to the superimposition of the fluorescence-reddening membrane had a brightness of 100 cd/m$^2$, whereas the red light after the superimposition thereof having a chromaticity x of 0.59 and y of 0.34 was obtained with a brightness of 34 cd/m$^2$ and with a conversion efficiency of 34%. The emission spectrum of the red light thus obtained is given in FIG. 4.

Figure 5:
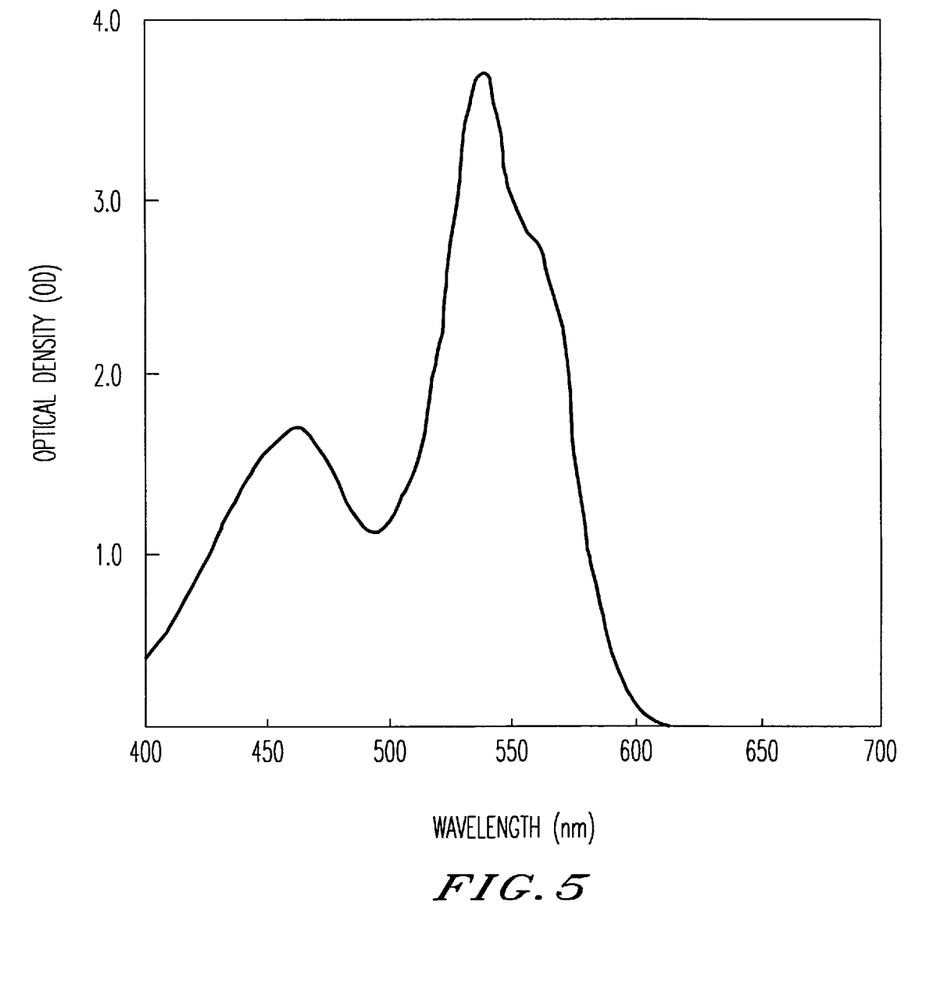
FIG. 5 is an absorption spectrum of a fluorescence-reddening membrane in Example 1.
Figure 10:
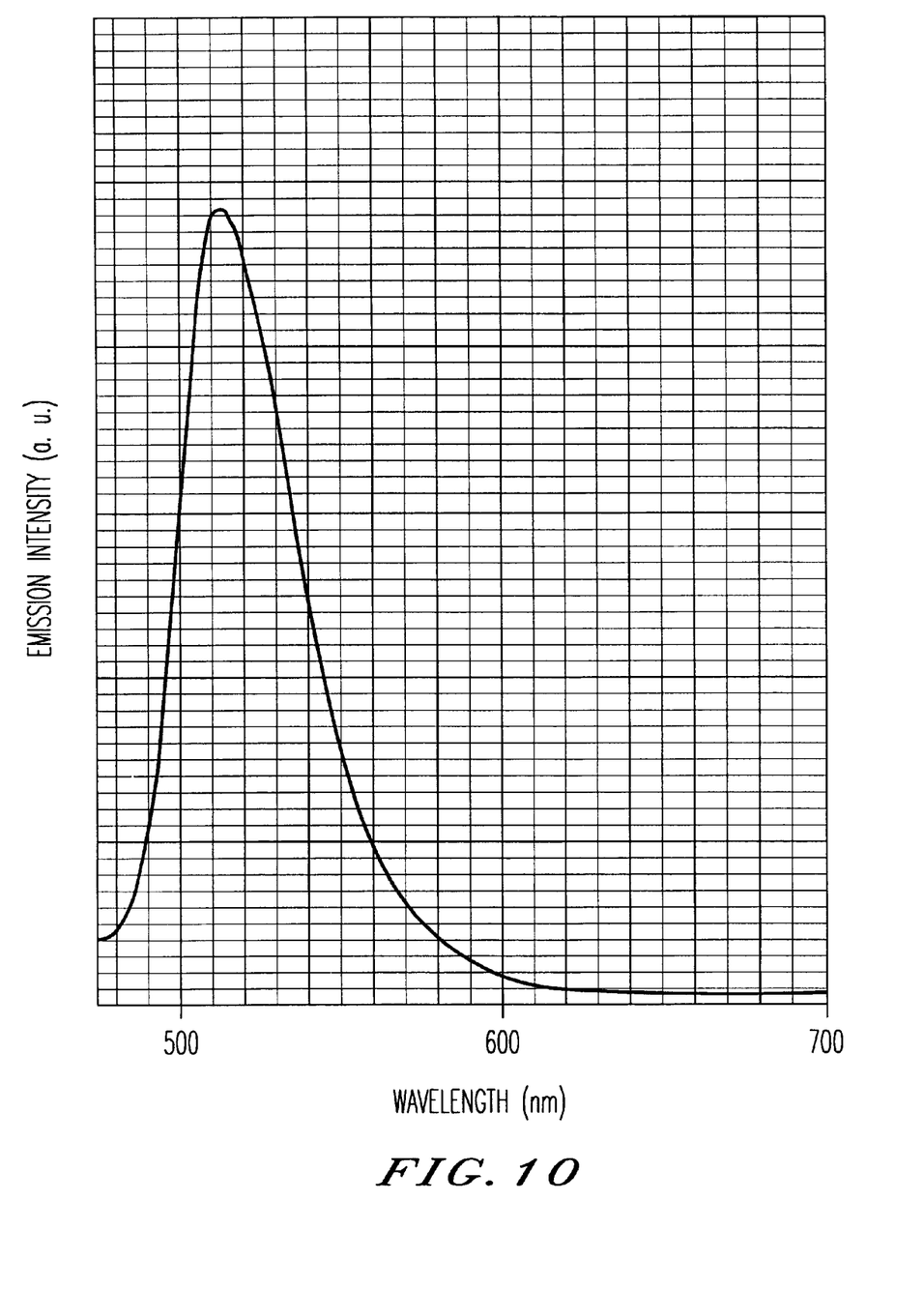
FIG. 10 is an emission (fluorescence) spectrum of a naphthalimide base fluorescence pigment (excitation at 460 nm)

Moreover, the absorption spectrum of the fluorescence-reddening membrane thus prepared is given in FIG. 5. It can be seen that in the absorption spectrum corresponding to the naphthalimide base fluorescence pigment (FIG. 8), said pigment has absorptions in the blue region, that is, at 520 nm and less and also has an optical density OD of 1.0 or more at a wavelength in the range of 420 to 490 nm, thereby sufficiently interrupting the blue light from the organic EL device. It is further understood that effective energy transfer is made to the rhodamine base fluorescence pigment by partially overlapping the absorption spectrum corresponding thereto (FIG. 7), or the rhodamine base fluorescence pigment is allowed to reabsorb the light emitted by the naphthalimide base fluorescence pigment (FIG. 10).

EXAMPLE 2

A bar coated membrane to be used as a fluorescence-reddening membrane was prepared by dissolving 1.3 g of a rhodamine base fluorescence pigment containing benzoguanamine resin, 1% by weight based on the same of basic violet 11 and 1% by weight based on the same of basic red 1; 20 mg of solvent yellow 116; and 20 mg of solvent yellow 44, in 2.3 g of an ink (solid content of 40% by weight) in which polyvinyl chloride resin (molecular weight of 20,000) as a printing medium was dissolved in cyclohexanone. The resultant membrane had a thickness of 60 $\mu$m as measured with a micrometer.

Subsequently, the blue-emitting organic EL device (chromaticity x of 0.16 and y of 0.15, blue) which had been prepared in Preparation Example 1 was allowed to emit light under the conditions including a voltage of 7V and a current density of 4.2 mA/cm$^2$, and was brought into tight contact with the fluorescence-reddening membrane thus prepared, while a fluorohydrocarbon liquid (FC-70) was inserted therebetween so as to form a red-emitting deveice. A measurement was made of the brightness of the output light by means of a brightness meter (produced by Minolta Co., Ltd. under the trade name CS-100). As a result, the blue light prior to the superimposition of the fluorescence-reddening membrane had a brightness of 100 cd/m$^2$, whereas the red light after the superimposition thereof having a chromaticity x of 0.60 and y of 0.33 was obtained with a brightness of 33 cd/m$^2$ and with a conversion efficiency of 33%.

The absorption spectrum of the fluorescence-reddening membrane thus prepared was the same as that in FIG. 5.

EXAMPLE 3

A bar coated membrane to be used as a fluorescence-reddening membrane was prepared by dissolving 0.12 g of a coumarin base fluorescence pigment containing benzoguanamine resin and 5% by weight based on the same of coumarin 6; and 0.2 g of a rhodamine bas fluorescence pigment same as that used in Example 1, in 2 g of an ink (solid content of 40% by weight) in which polyester resin (molecular weight of 40,000) as a printing medium was dissolved in ethyl cellosolve acetate. The resultant membrane had a thickness of 35 $\mu$m as measured with a micrometer.

Subsequently, the blue-emitting organic EL device (chromaticity x of 0.16 and y of 0.15, blue) which had been obtained in Preparation Example 1 was allowed to emit light under the conditions including a voltage of 7V and a current density of 4.2 mA/cm$^2$, and was brought into tight contact with the fluorescence-reddening membrane thus prepared, while fluorohydrocarbon liquid (FC-70) was inserted therebetween so as to form a red-emitting deveice. A measurement was made of the brightness of the output light by means of a brightness meter (produced by Minolta Co., Ltd. under the trade name CS-100). As a result, the blue light prior to the superim- position of the fluorescence-reddening membrane had a brightness of 100 cd/m$^2$, whereas the red light after the superimposition thereof having a chromaticity x of 0.60 and y of 0.32 was obtained with a brightness of 33 cd/m$^2$ and with a conversion efficiency of 33%.

Figure 6:
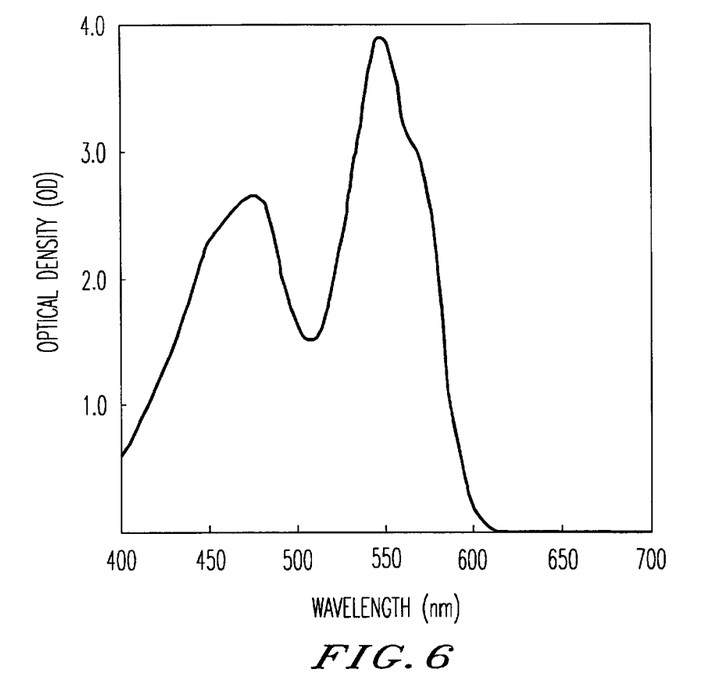
FIG. 6 is an absorption spectrum of a fluorescence-reddening membrane in Example 3.
Figure 9:
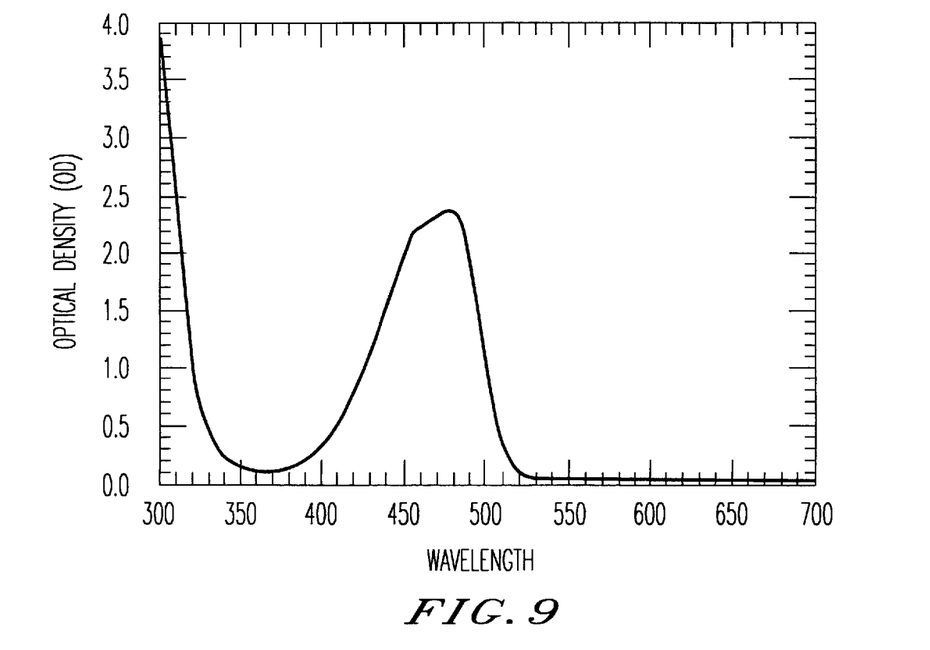
FIG. 9 is an absorption spectrum corresponding to a coumarin base fluorescence pigment in Example 3.
Figure 11:
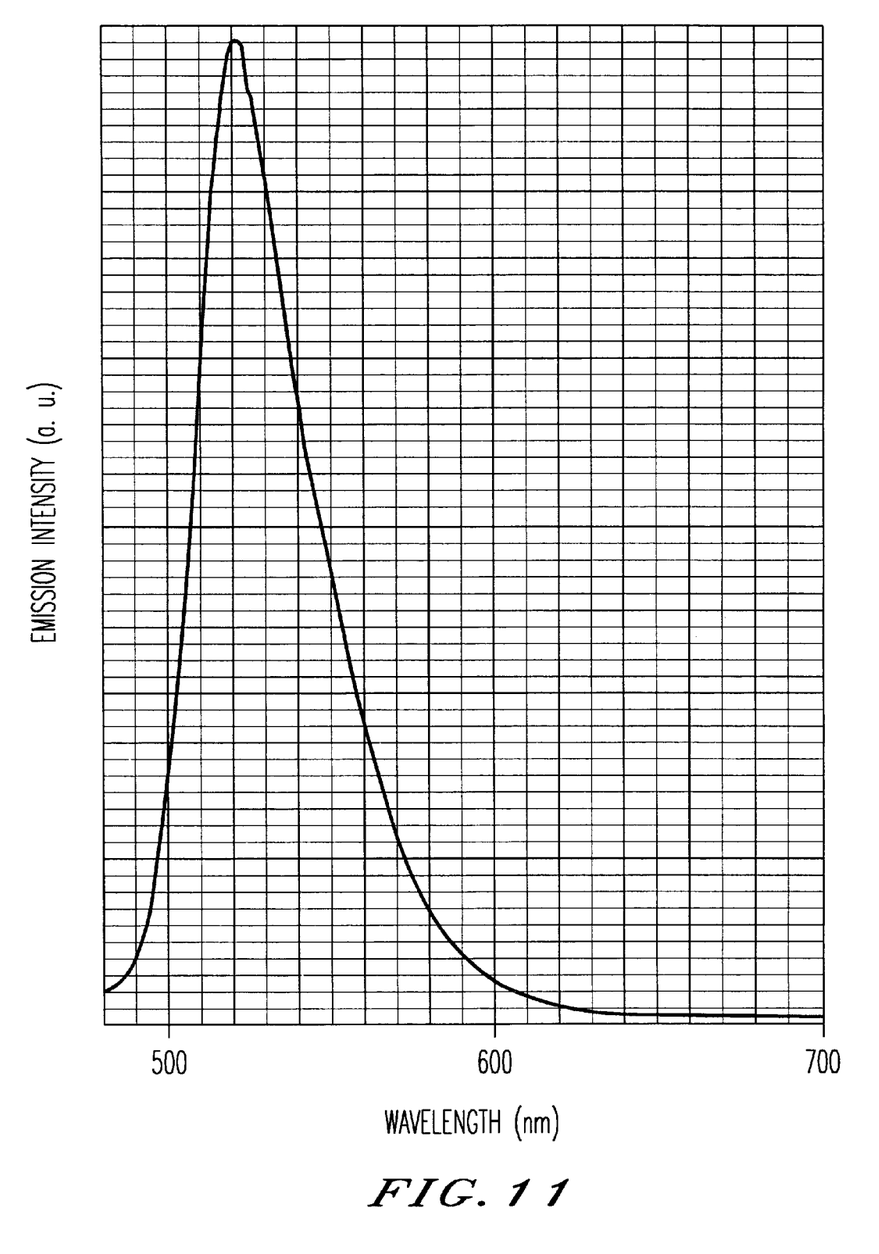
FIG. 11 is an emission (fluorescence) spectrum of a cumarin base fluorescence pigment (excitation at 460 nm).

Moreover, the absorption spectrum of the fluorescence-reddening membrane thus prepared is given in FIG. 6. It can be seen that in the absorption spectrum corresponding to the coumarin base fluorescence pigment (FIG. 9), said pigment has absorptions in the blue region, that is, at a wavelength of 520 nm and less and also has an optical density OD of 1.0 or more at a wavelength in the range of 420 to 490 nm, thereby sufficiently interrupting the blue light from the organic EL device. It is further understood that effective energy transfer is made to the rhodamine base fluorescence pigment by partially overlapping the absorption spectrum corresponding thereto (FIG. 7), or the rhodamine base fluorescence pigment is allowed to reabsorb the light emitted by the coumarin base fluorescence pigment (FIG. 11).

EXAMPLE 4

A bar coated membrane to be used as a fluorescence-reddening membrane was prepared by dissolving 1.3 g of the rhodamine base fluorescence pigment same as that used in Example 2 and 30 mg of coumarin 7, in 2.3 g of an ink (solid content of 40% by weight) in which polyester resin (molecular weight of 40,000) as a printing medium was dissolved in ethyl cellosolve acetate. The resultant membrane had a thickness of 45 μm as measured with a micrometer.

Subsequently, the blue-emitting organic EL device (chromaticity x of 0.16 and y of 0.15, blue) which had been prepared in Preparation Example 1 was allowed to emit light under the conditions including a voltage of 7V and a current density of 4.2 mA/cm², and was brought into tight contact with the fluorescence-reddening membrane thus prepared, while a fluorohydrocarbon (FC-70) liquid was inserted therebetween so as to form a red-emitting deveice. A measurement was made of the brightness of the output light by means of a brightness meter (produced by Minolta Co., Ltd. under the trade name CS-100). As a result, the blue light prior to the superimposition of the fluorescence-reddening membrane had a brightness of 100 cd/m², whereas the red light after the superimposition thereof having a chromaticity x of 0.59 and y of 0.33 was obtained with a brightness of 33 cd/m² and with a conversion efficiency of 33%.

Moreover, the absorption spectrum of the fluorescence-reddening membrane thus prepared was same as that in FIG. 6.

COMPARATIVE EXAMPLE 1

A bar coated membrane to be used as a fluorescence-reddening membrane was prepared by dissolving 0.2 g of the rhodamine base fluorescence pigment same as that used in Example 1, in 2.0 g of an ink (solid content of 40% by weight) in which polyvinyl chloride resin (molecular weight of 20,000) as a printing medium was dissolved in cyclohexanone. The resultant membrane had a thickness of 40 μm as measured with a micrometer.

Subsequently, the blue-emitting organic EL device (chromaticity x of 0.16 and y of 0.15, blue) which had been prepared in Preparation Example 1 was allowed to emit light under the conditions including a voltage of 7V and a current density of 4.2 mA/cm², and was brought into tight contact with the fluorescence-reddening membrane thus prepared, while a fluorohydrocarbon liquid (FC-70) was inserted therebetween so as to form a red-emitting deveice. A measurement was made of the brightness of the output light by means of a brightness meter (produced by Minolta Co., Ltd. under the trade name CS-100). As a result, the blue light prior to the superimposition of the fluorescence-reddening membrane had a brightness of 100 cd/m², whereas a light after the superimposition thereof having a chromaticity x of 0.56 and y of 0.23 other than the red light was obtained with a low brightness of only 10 cd/m² and with a low conversion efficiency of only 10%.

Figure 7:
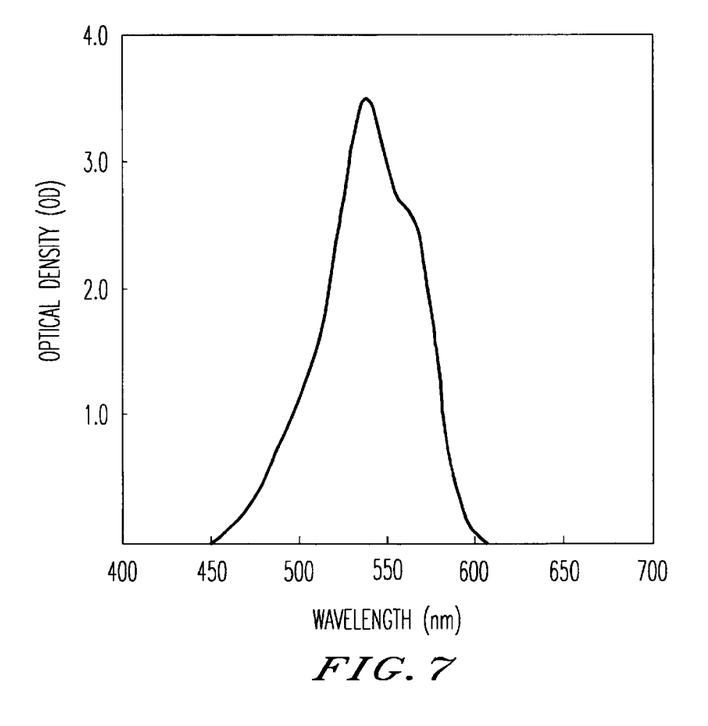
FIG. 7 is an absorption spectrum of a fluorescence conversion membrane (comprising rhodamine base fluorescence pigment alone) in Comparative Example 1.
Figure 8:
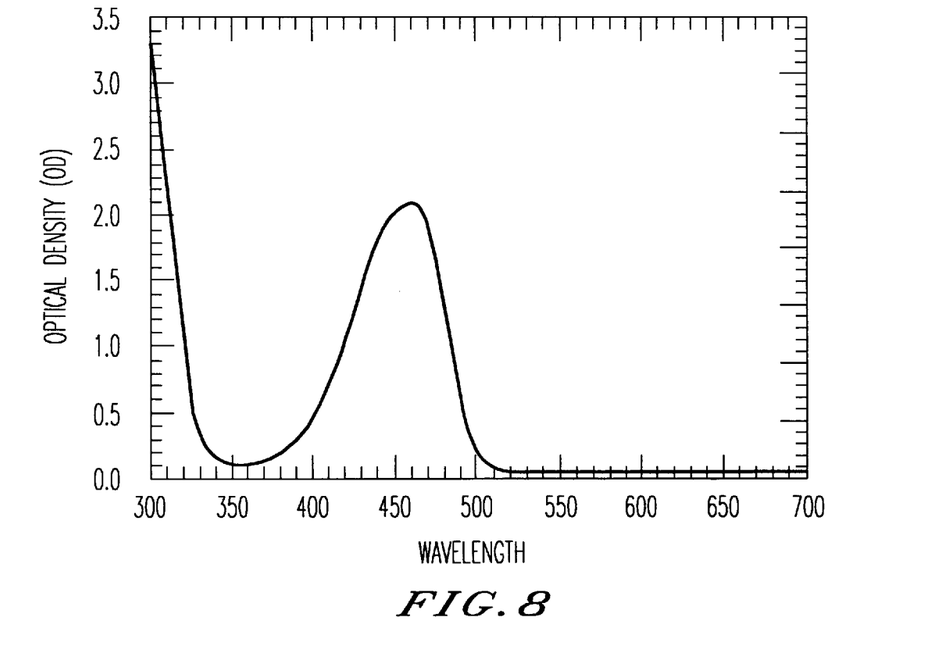
FIG. 8 is an absorption spectrum corresponding to a naphthalimide base fluorescence pigment in Example 1.

Moreover, the absorption spectrum of the fluorescence-reddening membrane thus prepared is given in FIG. 7. It can be seen therefrom that the absorption spectrum is devoid of absorptions in the blue region, that is, devoid of optical density OD of 1.0 or more at a wavelength in the range of 420 to 490 nm, thereby failing to sufficiently interrupt the blue light from the organic El device. It is further understood that effective energy transfer is never made to the rhodamine base fluorescence pigment from the blue light of the organic EL device, and that the fluorescence pigment is not allowed to reabsorb the emitted light, thus causing failure to generate red light and bringing about a low conversion efficiency.

COMPARATIVE EXAMPLE 2

A cast membrane to be used as a fluorescence-reddening membrane was prepared by dissolving 4.2 mg of rhodamine B and 1.8 g of polyvinyl pyrrolidinone (PVP, molecular weight of 360,000, approx.) in dichloromethane. The resultant membrane had a thickness of 50 μm as measured with a micrometer.

Subsequently, the blue-emitting organic EL device (chromaticity x of 0.16 and y of 0.15, blue) which had bene obtained in Preparation Example 1 was allowed to emit light under the conditions including a voltage of 7V and a current density of 4.2 mA/cm². The blue-emitting organic EL device, the fluorescence-reddening membrane thus prepared and the membrane of the color filter for chromaticity regulation which had been obtained in Preparation Example 2 were brought into tight contact with one another in this order, while a fluorohydrocarbon liquid (FC-70) was inserted therebetween so as to form a red-emitting deveice. A measurement was made of the brightness of the output light by means of a brightness meter (produced by Minolta Co., Ltd. under the trade name CS-100). As a result, the blue light prior to the superimposition of the fluorescence-reddening membrane and the membrane of the color filter for chromaticity regulation had a brightness of 100 cd/m², whereas a red light after the superimposition thereof having a chromaticity x of 0.56 and y of 0.28 was obtained with a low brightness of only 5 cd/m² and with a low conversion efficiency of only 5%.

It can be seen therefrom that, although the red light was obtained by the location of the color fiter interrupting the blue color, effective energy transfer is never made to the rhodamine base fluorescence pigment form the blue light of the organic EL device, and that the fluorescence pigment is not allowed to reabsorb the emitted light, thus bringing about a low conversion efficiency.

As a conclusion, the fluorescence-reddening membrane according to the present invention can convert the light emitted by a blue-emitting organic EL device at a high conversion efficiency as high as 33% or more, and besides the red-emitting device which comprises the fluorescence-reddening membrane and a light-emitting device can emit a red light at a high conversion efficiency, curtail its production cost, and reduce the size and thickness of itself.

INDUSTRIAL APPLICABILITY

The red-emitting device according to the present invention is favorably used for a back light of office automation (OA) equipment, a clock and watch, a back light of each of various displays and a self-emitting multi-color or full-color display.

What is claimed is:

1. A fluorescence-reddening membrane which comprises a light-transmittable medium and, dispersed therein, (a) a rhodamine base fluorescence pigment and (b) a fluorescence pigment which has absorptions in the blue region at a wavelength of 520 nm or less and induces energy transfer to and reabsorptions from the rhodamine base fluorescence pigment and wherein said membrane has an optical density OD of 1.0 or more at a wavelength in the range of 420 to 490 nm.

2. The fluorescence-reddening membrane according to claim 1, wherein a rhodamine base fluorescence pigment and a naphthalimide base fluorescence pigment are dispersed in a light-transmittable medium.

3. The fluorescence-reddening membrane according to claim 1, wherein a rhodamine base fluorescence pigment and a coumarin base fluorescence pigment are dispersed in a light-transmittable medium.

4. The fluorescence-reddening membrane according to claim 1, wherein the (a) rhodamine base fluorescence pigment comprises the mixture of basic violet 11 and rhodamine 6 G.

5. The fluorescence-reddening membrane according to claim 2, wherein the (a) rhodamine base fluorescence pigment comprises the mixture of basic violet 11 and rhodamine 6 G.

6. The fluorescence-reddening membrane according to claim 3, wherein the (a) rhodamine base fluorescence pigment comprises the mixture of basic violet 11 and rhodamine 6 G.

7. The fluorescence-reddening membrane according to claim 2, wherein the naphthalimide base fluorescence pigment comprises the mixture of solvent yellow 116 and solvent yellow 44.

8. The fluorescence-reddening membrane according to claim 3, wherein the coumarin base fluorescence pigment comprises coumarin 6 or coumarin 7.

9. The fluorescence-reddening membrane according to claim 1, wherein the light-transmittable medium is a printing medium.

10. The fluorescence-reddening membrane according to claim 2, wherein the light-transmittable medium is a printing medium.

11. The fluorescence-reddening membrane according to claim 3, wherein the light-transmittable medium is a printing medium.

12. A red-emitting device which comprises the fluorescence-reddening membrane as set forth in claim 1 and a light-emitting device.

13. The red-emitting device according to claim 12, wherein the light-emitting device is a blue-emitting organic electroluminescence device.

14. The fluorescence-reddening membrane according to claim 1, wherein the light-transmittable medium is a photosensitive resin.

15. The fluorescence-reddening membrane according to claim 2, wherein the light-transmittable medium is a photosensitive resin.

16. The fluorescence-reddening membrane according to claim 3, wherein the light-transmittable medium is a photosensitive resin.

17. The fluorescence-reddening membrane according to claim 1, wherein the light-transmittable medium is a thermosetting resin.

18. The fluorescence-reddening membrane according to claim 2, wherein the light-transmittable medium is a thermosetting resin.

19. The fluorescence-reddening membrane according to claim 3, wherein the light-transmittable medium is a thermosetting resin.

* * * * *